Nov. 21, 1950 B. P. BAKER ET AL 2,530,933

CIRCUIT INTERRUPTER

Filed May 7, 1945 6 Sheets-Sheet 1

WITNESSES:
N. F. Susser.
W. R. Crout

INVENTORS
Benjamin P. Baker and
Jack E. Schrameck.
BY
Ralph H. Swingle
ATTORNEY

CIRCUIT INTERRUPTER

Filed May 7, 1945

WITNESSES:
N. F. Susser
W. R. Crout

INVENTORS
Benjamin P. Baker and
Jack E. Schrameck.
BY
Ralph H. Swingle
ATTORNEY

Nov. 21, 1950 B. P. BAKER ET AL 2,530,933

CIRCUIT INTERRUPTER

Filed May 7, 1945 6 Sheets-Sheet 3

INVENTORS
Benjamin P. Baker and
Jack E. Schrameck.
BY
Ralph H. Swingle
ATTORNEY

Nov. 21, 1950 B. P. BAKER ET AL 2,530,933

CIRCUIT INTERRUPTER

Filed May 7, 1945 6 Sheets-Sheet 4

WITNESSES:

H. F. Susser

W. R. Crout

INVENTORS

Benjamin P. Baker and

Jack E. Schrameck.

BY

Ralph H. Swingle

ATTORNEY

Nov. 21, 1950 B. P. BAKER ET AL 2,530,933

CIRCUIT INTERRUPTER

Filed May 7, 1945 6 Sheets-Sheet 5

WITNESSES:

H. F. Susser.

W. R. Crout

INVENTORS
Benjamin P. Baker and
Jack E. Schrameck.
BY
Ralph H. Swingle
ATTORNEY

Nov. 21, 1950 B. P. BAKER ET AL 2,530,933

CIRCUIT INTERRUPTER

Filed May 7, 1945 6 Sheets-Sheet 6

WITNESSES:

*H. F. Susser.*

*W. R. Crout*

INVENTORS

Benjamin P. Baker and
Jack E. Schrameck.

BY

*Ralph H. Swingle*

ATTORNEY

Patented Nov. 21, 1950 2,530,933

UNITED STATES PATENT OFFICE 2,530,933

CIRCUIT INTERRUPTER

Benjamin P. Baker, Turtle Creek, and Jack E. Schrameck, Pittsburgh, Pa., assignors to Westinghouse Electric Corporation, East Pittsburgh, Pa., a corporation of Pennsylvania Application May 7, 1945, Serial No. 592,410

17 Claims. (Cl. 200—82)

This invention relates to circuit interrupters and more particularly to fluid blast circuit interrupters of the fluid pressure operated type.

A general object of the invention is to provide a circuit interrupter of the compressed gas type which is of improved construction and which operates to more effectively interrupt the circuit therethrough while minimizing the shock imposed on the operating mechanism.

A more specific object is to provide an improved circuit interrupter of the gas blast type in which the operating means includes means for causing the retarding gas on the non-working side of the operating piston to be substantially the same on a straight opening operation as on the opening portion of a closing-opening operation.

A further object is to employ such an improved operating means as set forth in the preceding paragraph not only on a compressed gas circuit interrupter of the functional dumping type but also on a compressed gas circuit interrupter in which position dumping is employed.

Another object is to provide an improved circuit interrupter of the compressed gas type in which the retarding gas on the non-working side of the piston is substantially the same during the deceleration period on a straight closing operation as on an open-close operation.

Another object is to provide an improved pneumatic selector mechanism associated with a valve device as applied to a compressed gas circuit interrupter so that the selector mechanism will be operable to permit opening air to be forced on the non-working side of the piston during a straight opening ooperation but will not permit the opening air to be placed on the non-working side of the piston during the opening of a close-open operation. If desirable, such an improved selector mechanism may be employed to bring about the same result on the non-working side of the piston during the closing operation. Thus, a valve device having two pneumatic selector mechanisms may be employed.

In the operation of pneumatic mechanisms of compressed air circuit interrupters, large accelerating forces are used to impart high speeds quickly to moving contact parts which are relatively massive. After these high initial speeds are obtained, it becomes necessary to introduce decelerating forces to dissipate the energy of the moving parts, thus reducing the shock of stopping and at the same time preventing excessive rebound of these parts. This decelerating force previously has been obtained by compressing air beneath the main operating piston, and then letting it escape through ports to atmosphere at a rate calculated to reduce shock of opening and at the same time exhausting enough of the compressed air to prevent excessive rebound.

However, the opening of a closing-opening operation is different from a straight opening operation in that air is admitted below the main piston for the closing of the closing-opening operation which changes the amount of air compressed on opening. When the escape ports are set to handle correctly the amount of air compressed on a straight opening, this adjustment does not apply to the opening of a closing-opening operation. The result has been to compromise. That is, a relatively large bounce with its attendant shock had to be tolerated on a straight opening operation to get opening on a closing-opening operation with the proper contact speed. The mechanism incorporated a main exhaust valve, which exhausted the closing air at the point of the breaker closed position; however, this valve was inadequate due to the time interval permissible during which it could exhaust air and due to space limitations on its size. A further object of our invention is to remedy the foregoing difficulties.

Further objects and advantages will readily become apparent upon a reading of the following specification taken in conjunction with the drawings, in which.

Figures 6, 9, 19:
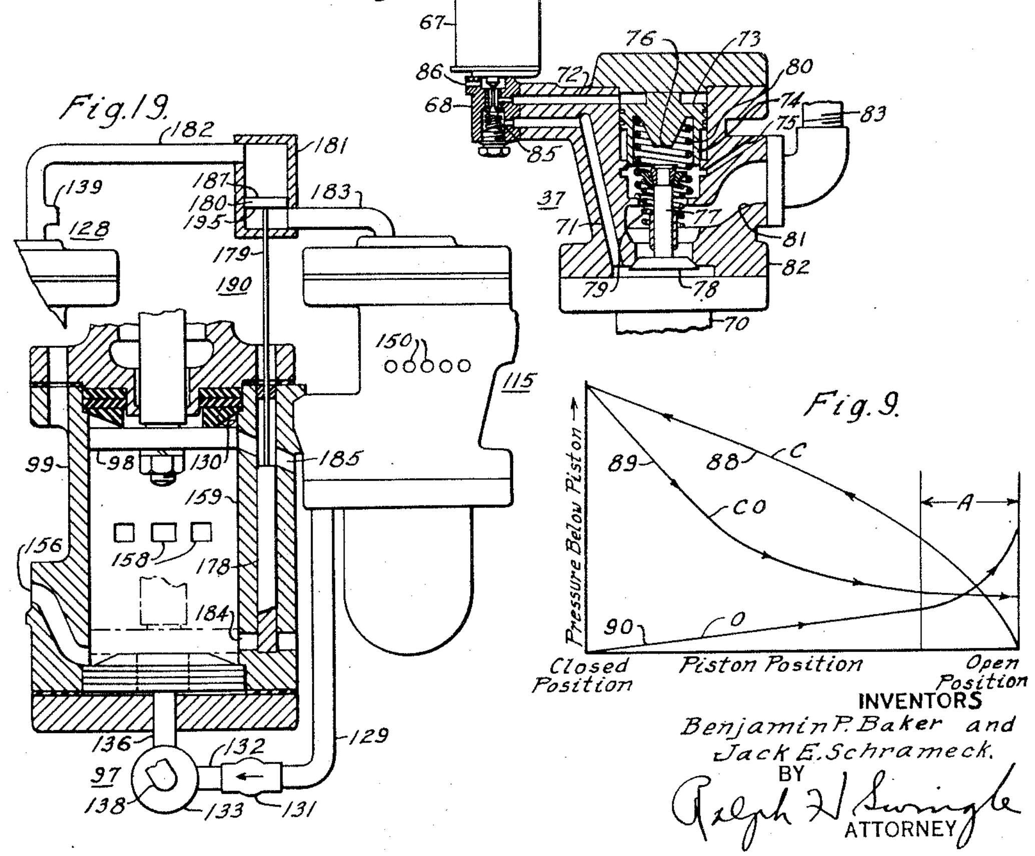
Fig. 6 is an enlarged vertical sectional rear view of the closing valve mechanism for the circuit interrupter of Fig. 1.
Fig. 9 is a graph of the pressure on the lower side of the piston as a function of the piston position on opening, and on a closing and opening of a closing-opening operation.
Figure 10:
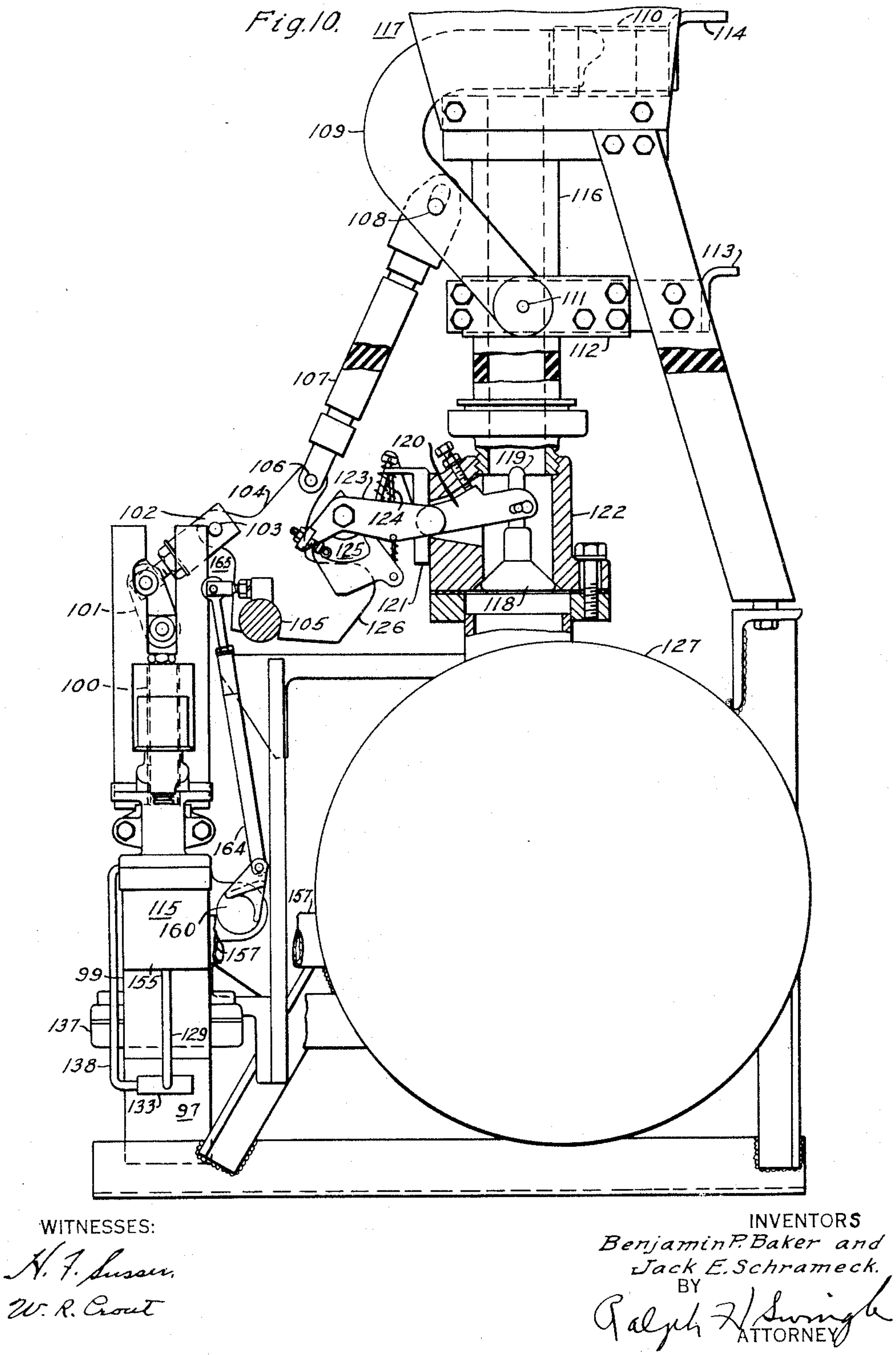
Fig. 10 is a side elevation view, partly in section, of a circuit interrupter of different form embodying our invention.
Figure 11:
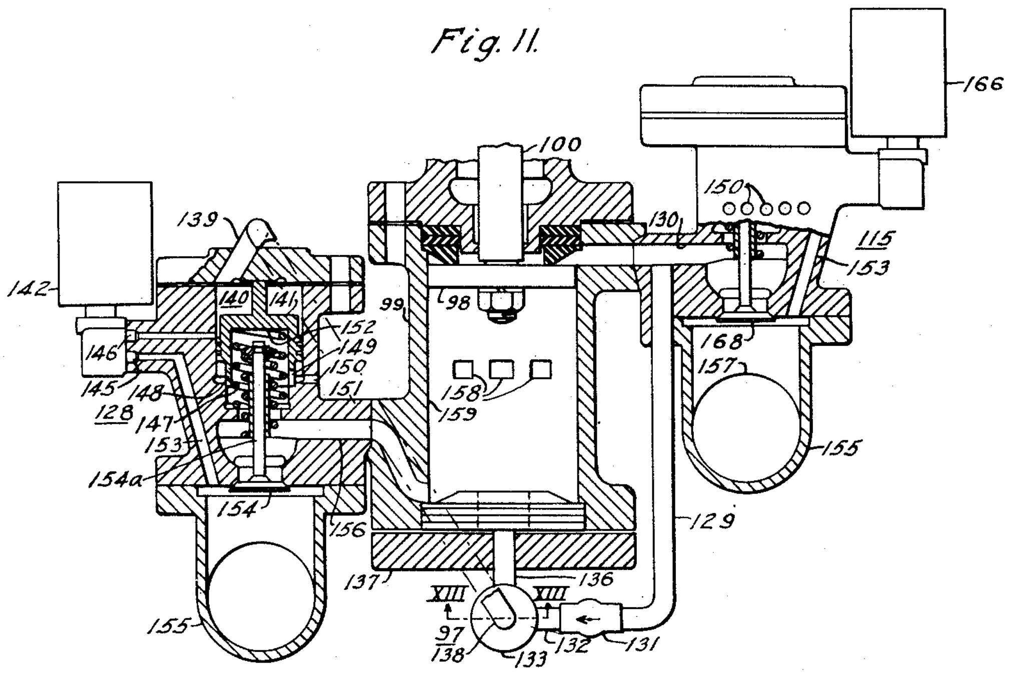
Fig. 11 is a front vertical sectional view of the mechanism shown in Fig. 10, the several portions being enlarged and the contacts being shown in the closed circuit position.
Figures 14, 15, 16, 17, 18:
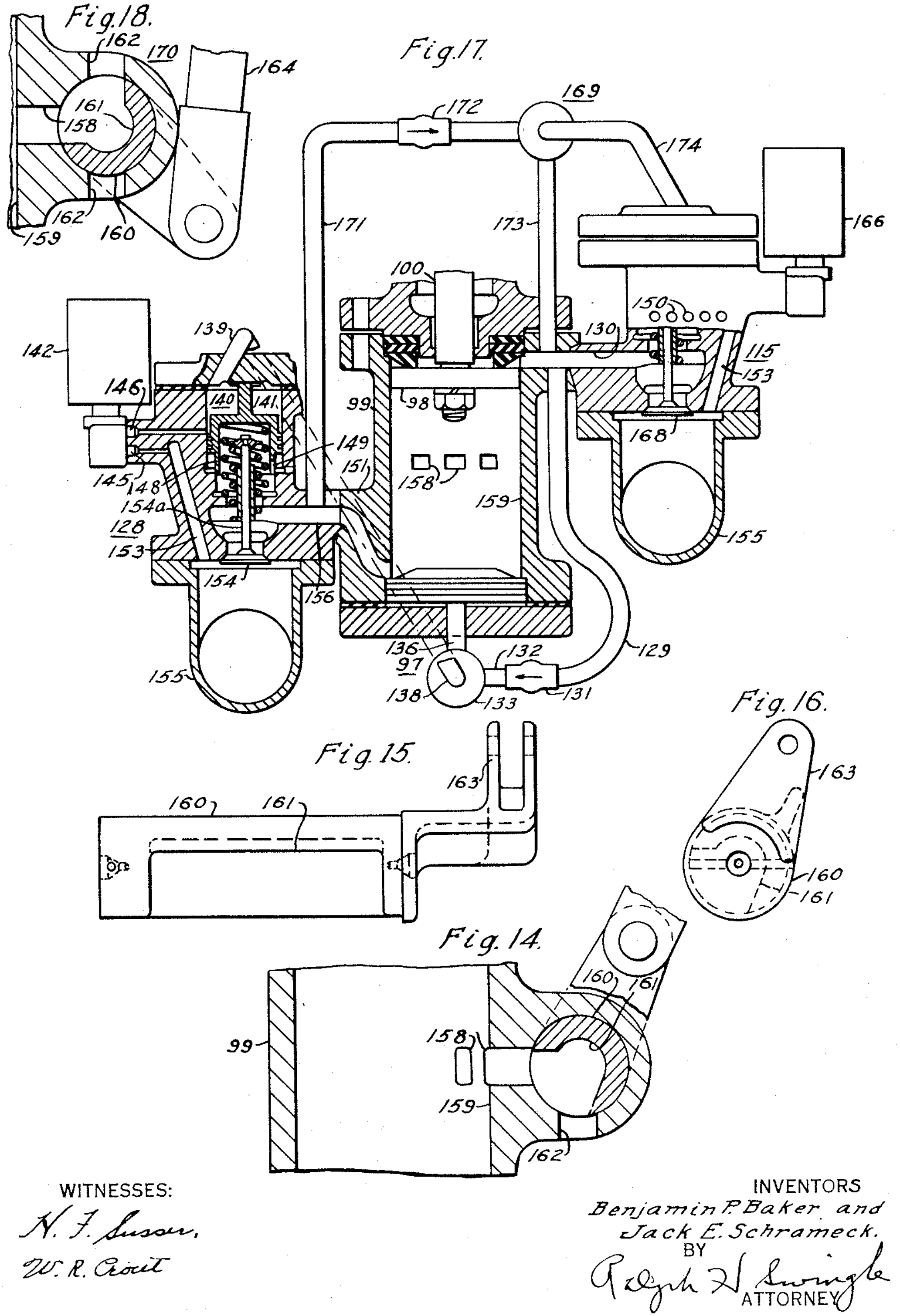
Fig. 14 is a fragmentary enlarged vertical sectional view through the position dump valve of Fig. 11, the position of the operating arm for operating the same being shown.

Figs. 15 and 16 collectively show the configuration of the rotary dump valve employed in the mechanism of Figs. 11 through 14 of the interrupter of Fig. 10;

Fig. 17 is a vertical sectional view through a modified type of operating mechanism which is similar in form to the mechanism set forth in Fig. 11 but employing a second pneumatic selector mechanism;

Fig. 18 is a vertical sectional enlarged view of the two position rotary dump valve employed in the mechanism of Fig. 17, the position of the operating arm for the rotary dump valve being indicated; and Fig. 19 is a fragmentary vertical sectional view through a mechanism similar to that set forth in Fig. 11 but employing a functional dump valve instead of a position dump valve as was used in both Figs. 11 and 17.

Figures 1, 2:
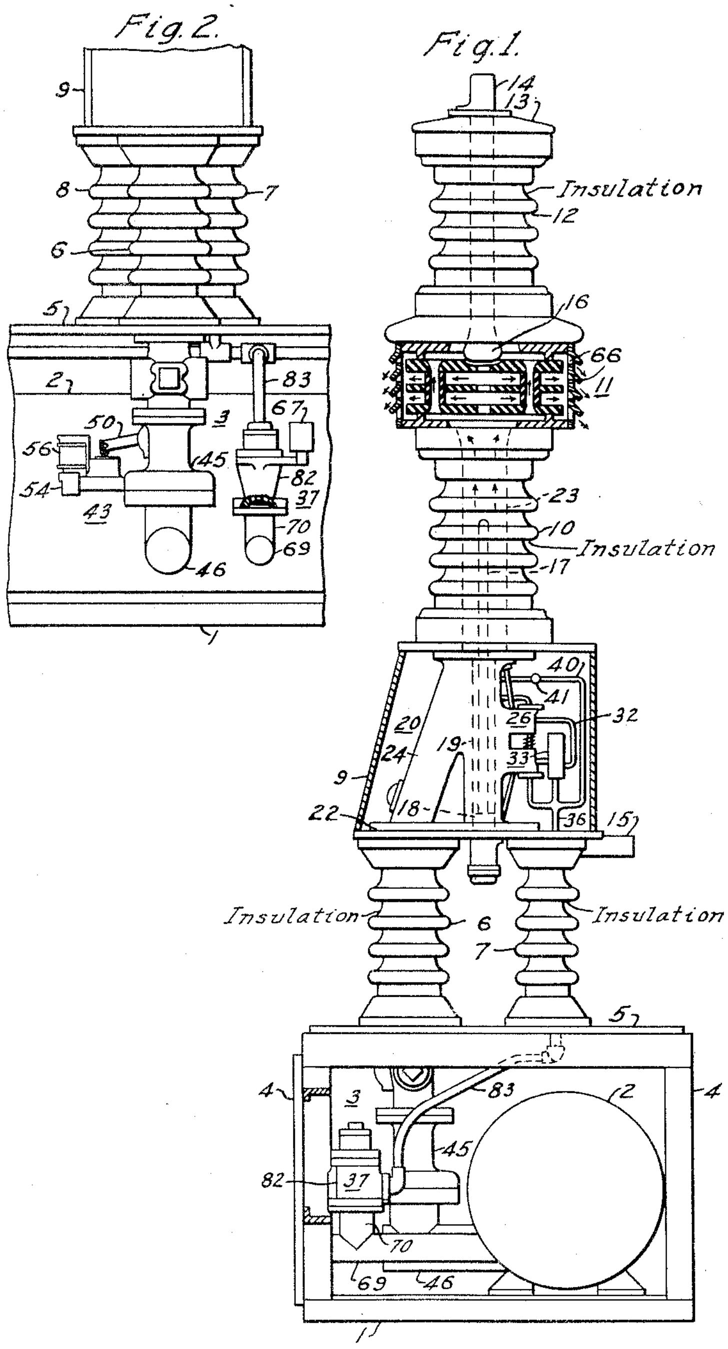
Figure 1 is a side elevational view, partly in section, of the center pole of a three-phase circuit interrupter employing our invention and shown in the open circuit position.
Fig. 2 is a fragmentary front elevational view of the lower portion of the circuit interrupter shown in Fig. 1.

Referring to the drawings and more particularly to Fig. 1 thereof, the reference numeral 1 designates a suitable base composed of structural steel framework which supports a tank 2 of compressed gas and a portion of the valve mechanism 3 for the interrupter. Vertical structural steel members 4 support horizontally disposed structural members 5 which for each pole of the interrupter, only one pole being shown, support three hollow porcelain supports 6, 7 and 8. The porcelains 6, 7 and 8 support a metallic casing 9 which in turn supports a hollow insulator 10 at the upper end of which is positioned an arc extinguishing structure generally designated by the reference numeral 11. Supported on top of the arc extinguishing structure 11 is a hollow porcelain 12 which in turn supports a metallic terminal cap 13 to which is affixed a terminal 14 of the interrupter.

The other terminal for the single pole of the interrupter is designated by the reference numeral 15 and is electrically connected to the metallic casing 9. A stationary contact 16 is supported by the terminal cap 13 and extends partially into the arc extinguishing structure 11. Cooperable with the stationary contact 16 is a movable contact 17, the lower end of which is secured to a two-way acting piston 18 reciprocally movable in a vertical direction within an operating cylinder 19. The operating cylinder 19 is formed as a portion of a casting member 20 which is disposed within the casing 9.

The arc extinguishing structure 11 forms no part of our invention and is preferably of a type disclosed in U. S. Patent No. 2,313,159 which issued March 9, 1943, to Leon R. Ludwig and Benjamin P. Baker and which is assigned to the assignee of the instant application. Also certain portions of the operating structure are of the type set forth in U. S. Patent No. 2,342,809 which issued February 29, 1944, to Leon R. Ludwig, Benjamin P. Baker, and James M. Cumming and which is also assigned to the assignee of the instant application. Since the aforesaid two patents describe certain constructional features of the interrupter herein set forth, it is believed only a cursory description of these features is necessary for an understanding of our invention.

Figures 3, 4:
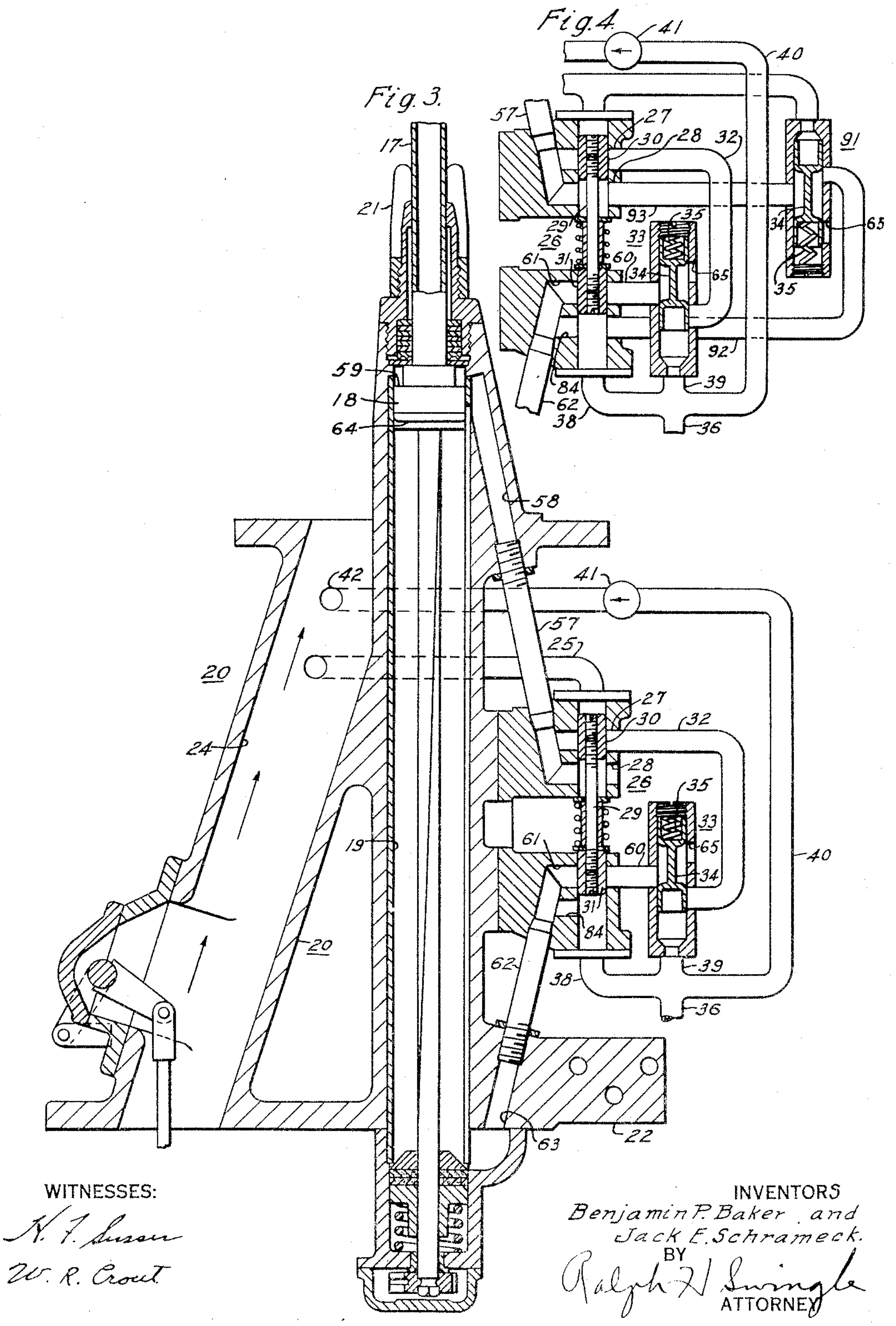
Fig. 3 is an enlarged fragmentary vertical sectional view of a portion of the operating mechanism for the interrupter shown in Fig. 1, the contacts being shown in the closed circuit position.
Fig. 4 is a fragmentary vertical sectional view through a modified type of circuit interrupter similar in construction to that shown in Figs. 1–3 but employing a second pneumatic selector mechanism to be operable during the closing operations.

From the foregoing it will be apparent that in the closed circuit position of the interrupter set forth in Fig. 3, the electrical circuit therethrough comprises terminal 14, stationary contact 16, movable contact 17, fingers 21 (Fig. 3), casting member 20, bracket 22 and terminal 15. During the opening operation, opening air is employed to force the piston 18 downwardly within the operating cylinder 19 to effect disengagement of the movable contact 17 from the stationary contact 16 to draw an arc within the arc extinguishing structure 11. The arc is extinguished in the arc extinguishing structure 11 by the suitable directing of compressed gas which passes upwardly in the vertical passage 23 provided in the insulator 10. Extinction of the arc takes place in a manner as set forth in Patent No. 2,313,159, and the continued downward movement of the movable contact 17 effects an isolating gap into the circuit.

The opening air for effecting downward movement of the piston 18 is taken from the blast tube 24 through a conduit connection 25 (Fig. 3). The conduit 25 leads into the opening end of a valve device 26 associated with the operating cylinder 19. The valve device 26 is preferably of the type set forth in the aforesaid Patent No. 2,342,809. It has an inlet port 27 and an exhaust port 28 for the opening end of the operating cylinder 19 which are controlled by the single movable valve member 29 movable within the valve device 26. The valve member 29 has valve elements 30 and 31 associated therewith, the valve element 30 being movable in the opening end of the valve device 26 and the valve element 31 being movable in the closing end of the valve device 26.

A conduit 32 interconnects the opening end of the valve device 26 with a first pneumatic selector mechanism generally designated by the reference numeral 33 and having a first selector valve 34 movable therein. The first selector valve 34 is biased downwardly by a compression spring 35. A conduit 36 transmitting closing air upwardly through the porcelain 7 from the closing valve mechanism 37 (Fig. 2) has a branch conduit 38 which leads to the closing end of the valve device 26.

The closing conduit 36 also has a branch conduit 39 leading to the first pneumatic selector mechanism 33 and a further branch conduit 40 which passes through a check valve 41 and terminates within the blast tube 24 at 42. Thus, during a closing operation, a portion of the closing air is transmitted into the blast tube 24 to pass upwardly through the hollow insulator 10 into the arc extinguishing structure 11 to retard the establishment of an arc between the contacts 16, 17 during a closing operation and to sweep out the arc gases formed when the circuit is established just before the contacts touch.

Figure 5:
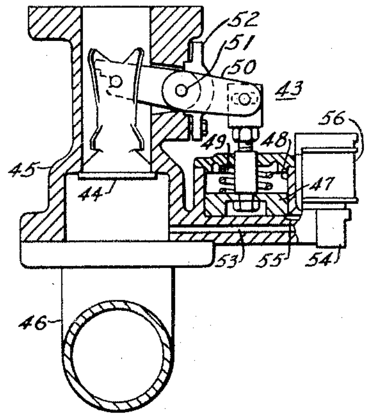
Fig. 5 is an enlarged rear elevational view, partly in section, of the blast valve mechanism for the circuit interrupter shown in Fig. 1.

The blast valve mechanism 43 for the interrupter (Fig. 2) is more clearly shown in Fig. 5.

It includes a blast valve 44 operable within a valve casing 45 to control the transmission of compressed gas from a reservoir 46 leading from the tank 2 upwardly through the porcelain 6 and through the blast tube 24 and insulator 10 to the arc extinguisher 11. Operation of the blast valve 44 is effected by upward movement of a piston 47 within a cylinder 48, the piston 47 being biased downwardly by a compression spring 49. Upward movement of the piston 47 causes rotation of a rocker arm 50 pivotally supported at 51 to a wall of the valve casing 45 and secured thereto by a bracket or clamp 52. The piston 47 moves upwardly in response to gas pressure transmitted through a passage 53 and through a pilot valve 54 and through a passage 55 to the lower side of the piston 47. The operation of the pilot valve 54 is brought about by energization of a solenoid 56, the latter being connected into the electrical circuit of the interrupter.

Thus, to effect an opening operation of the interrupter from the fully closed position thereof, as shown in Fig. 3, the solenoid 56 is energized. This actuates the pilot valve 54 to permit compressed gas to flow through the passage 53, through the pilot valve 54, through the passage 55 to the lower end of the piston 47 which is thereby forced upwardly against the downward biasing action of the compression spring 49 and against the further biasing action effected by the gas pressure acting upwardly against the blast valve 44.

The consequent opening of the blast valve 44 permits compressed gas in a large quantity to pass upwardly through the valve casing 45 past the blast valve 44 and upwardly through the insulator 6 into the blast tube 24. The gas blast now passes upwardly through the passage 23 provided in the hollow insulator 10 to the arc extinguisher 11 to be present upon drawing of the arc between the contacts 16, 17 within the arc extinguishing structure 11.

However, a portion of the opening air passing upwardly through the blast tube 24 acts through the conduit 25 to force the valve element 30 of the valve device 26 downwardly. This permits opening air to pass through the inlet port 27 through a pipe 57 and passage 58 to the top side or working side 59 of the piston 18. Also opening air passes from the opening end of the valve device 26 through the conduit 32, through the first selector mechanism 33 (selector valve 34 then being in its lower or open position not shown), through conduit 60, port 61 (valve element 31 now being down), through pipe 62 and passage 63 to the lower or non-working side 64 of the piston 18. The relative conduit sizes and the configuration of the conduits are such that the piston 18 is forced down rapidly to effect separation between the contacts 16, 17. Arc extinction takes place in a manner as set forth in Patent No. 2,313,159 and the movable contact 17 is forced to its lower position, as shown by the dotted lines in Fig. 1 to effect an isolating gap in the circuit.

After the blast valve 44 closes near the end of the opening stroke of the piston 18, the pressure remaining in the blast tube 24 is dissipated to atmosphere through the exhaust portion of the arc extinguisher 11. At this time, the valve device 26 is in the lower position and the valve 33 is open, and the pressure below the piston 18 also is exhausted to atmosphere through the passage 63, pipe 62, port 61, conduit 60, through selector mechanism 33, through conduit 32, through conduit 25, into the blast tube 24 through passage 23 provided in insulator 10 to the atmosphere exhaust portion of the arc extinguisher 11. It is to be observed that the blast valve 44 remains in the open position until the movable contact 17 is near its lower position. Therefore, the dumping or exhausting of the compressed air below the piston 18 takes place at or near the extreme end of the opening operation when the pressure has lowered within the blast tube 24 and porcelain 10 as the result of exhausting of air out of the extinguisher 11 through the louvered openings 66 provided therein.

The permitting of the passage of opening air below the piston 18, as well as above the piston 18, during a straight opening operation, as previously described, provides a cushioning action near the end of the opening stroke to thus minimize stresses imposed on the operating mechanism and on the supporting porcelains. The term "straight opening" operation means an opening operation from the closed position of the interrupter after the interrupter has been standing in the closed position a considerable length of time with the several portions of the mechanism being deenergized and with compressed gas from the closing operation having been exhausted from under piston 18.

To effect a closing operation, the solenoid 67 of the closing valve mechanism 37 (Fig. 6) is energized. This causes downward movement of the pilot valve 68 to permit compressed gas to pass from the reservoir 69 (Fig. 2) upwardly through conduit 70, passage 71, past pilot valve 68 through passage 72 to the top side of a valve piston 73. The valve piston 73 has a skirt 74 which upon downward movement of the piston 73 closes off a bleeder opening 75 and a portion 76 of the piston 73 strikes the stem 77 of the closing valve 78. The closing valve 78 is biased upwardly towards its closed position by a compression spring 79, and the piston 73 is also biased upwardly by a compression spring 80. The piston 73 moves downwardly because the effective area on its top surface is greater than the effective area on its lower surface.

The opening motion of the closing valve 78 permits compressed gas to pass upwardly from the conduit 70 through a passage 81 provided in the valve casing 82 to pass upwardly through a closing conduit 83 and upwardly through the hollow porcelain 7. At the top of the hollow porcelain 7 is a flanged conduit, not shown, which connects into the closing conduit 36.

Thus, to effect a straight closing operation of the interrupter after the interrupter has been in the open position a considerable length of time, the solenoid 67 is energized. This permits upward passage of the gas in the manner as previously set forth to the closing conduit 36. Here the closing air passes through the conduit 40, through check valve 41, opening 42 into the blast tube 24. This closing air then passes upwardly through the passage 23 in insulator 10 to control the establishment of an arc during the closing operation between the contacts 16, 17 within the arc extinguisher 11 as they approach one another.

Also closing air passes upwardly through branch conduit 38 into the valve device 26 forcing the single valve member 29 with its two valve elements 30, 31 upwardly, thereby permitting the upper or non-working end 59 of the piston 18 to be exhausted through passage 58, pipe 57, through the opening end of the valve device 26 and through the exhaust port 28 to atmosphere.

Closing air also passes from the branch conduit 38 through the inlet port 84, through pipe 62, passage 63 to the lower working end 64 of the piston 18. The net result is, therefore, an exhausting of air above the piston 18 and a permitting of the passage of closing air below the piston 18. Consequently, this effects rapid closing upward movement of the piston 18 and contact 17 to effect engagement of the movable contact 17 with the stationary contact 16.

It will be noted that at the beginning of the closing operation the selector valve 34 was in its lower position, being biased thereat by the compression spring 35. Thus during the closing operation, closing air passes upwardly through the branch conduit 39 into the first selector mechanism 33 to force the selector valve 34 upwardly to the closed position shown in Fig. 3. Thus, Fig. 3 shows the position of the parts at the end of the closing operation and before the pressure has died down in the closing conduit 36 to an extent necessary to permit downward or opening movement of the selector valve 34 by the compression spring 35.

It will be noted that upon deenergization of the solenoid 67 of the closing valve mechanism 37 of Fig. 6 the compression spring 85 forces the pilot valve 68 upwardly, thereby permitting the passage 72 to communicate with atmosphere through the port 86. Thus, the pilot valve 68 is a double acting valve, it acting in the deenergized state to permit dumping of air out of the passage 72 through the exhaust port 86, and in the energized state to close off the dumping of air from the passage 72 through the exhaust port 86.

The dumping or exhausting of closing air within the closing conduit 36 is brought about by a gradual exhausting of air through the bleeder opening 75 of the closing valve mechanism 37 and also through the conduit 40 and opening 42 leading into the blast tube 24. When this occurs, the selector valve 34 will be forced to its lower position by the compression spring 35.

The foregoing discussion has considered a straight opening operation and a straight closing operation. However, in a closing operation it may occur that overload conditions still exist in the circuit controlled by the interrupter so that when the contacts 16, 17 engage, the resulting overload current passing through the interrupter may be sufficient to trip a protective relay, not shown, and immediately energize the opening mechanism following the closing operation. In this event there is still closing air disposed below the piston 18 which has not had a chance to become exhausted. However, if it has not had a chance to become exhausted, the selector valve 34 will still be in its raised position, as shown in Fig. 3. Consequently, during the subsequent opening operation immediately following the closing operation, opening air entering the valve device 26 in a manner as previously described will force the valve member 29 downwardly but will not be permitted to pass through the conduit 32 and through the selector mechanism 33 inasmuch as the selector valve 34 will be in its raised position as shown, thereby cutting off communication between the conduits 32 and 60.

Thus, the occurrence of an opening operation immediately following a closing operation, employing our invention, will not permit opening air to be passed to the region below the piston 18. The air which is below the piston 18 resulting from the previous closing operation will be compressed and will be forced upwardly through the passage 63, pipe 62, port 61, through the valve device 26 (the valve member 29 being in its lower position), through conduit 60, through selector mechanism 33 and through exhaust port 65 to atmosphere.

From the foregoing discussion, it will be apparent that our device is operable during a straight opening operation to permit opening air to pass above and below the piston 18. During a straight closing operation, closing air passes only below the piston 18 while the region above the piston 18 is exhausted to atmosphere through the exhaust port 28. During an opening operation immediately following a closing operation, dependence is relied upon the previous closing air below the piston 18 to provide the desired cushioning effect, and this closing air below the piston 18 during such an opening operation is exhausted eventually through the exhaust port 65 associated with the first selector mechanism 33.

Figure 7:
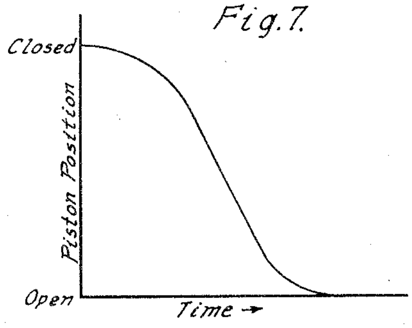
Figs. 7 and 8 represent travel curves indicating contact velocity.
Figure 8:
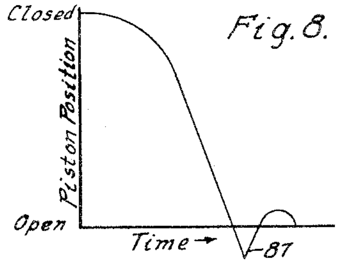

The foregoing pressure conditions result in a travel curve as set forth in Fig. 7 as contrasted with the undesirable travel curve as set forth in Fig. 8. It will be noted that in these travel curves the slope is proportional to contact velocity and that the sharp change in slope, as indicated at 87 in Fig. 8, indicates a considerable shock on the operating mechanism with the possibility of breakage of the procelains. By admitting air above and below the piston 18, the desired travel curve, as shown in Fig. 7, is obtained.

Fig. 9 graphically represents the pressure below the piston 18 during a closing operation C, during an opening operation O, and during an opening following a closing operation CO. More specifically, the reference numeral 88 represents the pressure below the piston 18 during a straight closing operation. It will be observed that the pressure starts at zero at the fully open position of the piston and rises as indicated by the curve 88 until the maximum pressure is obtained below the piston 18 in the closed position. This pressure will remain below the piston 18 if the contact 17 remains in the closed position and will gradually be lowered by dumping through the bleeder openings 75 of the closing valve mechanism 37 (Fig. 6) and through the conduit connection 40 to the blast tube 24. Thus, we have functional dumping, that is, no immediate dumping of the driving closing air occurs unless there is a pneumatic force tending to cause a contact reversal, that is, unless it is immediately desired to open the contacts following such a closing operation.

If the interrupter is immediately reopened following such a closing operation, the pressure below the piston 18 is represented progressively by the curve 89 as a function of piston position within the operating cylinder. As mentioned previously, the dumping of the air below the piston 18 takes place through the exhaust port 65 in the selector mechanism 33, the valve element 31 now blocking the branch conduit 38 and the selector piston 34 being in its raised position as the result of the previous closing operation. Thus, only if there is a pneumatic force tending to cause a reversal of contact motion is there a rapid dumping of air below the piston 18. As mentioned previously, should there be no contact reversal, or in other words should the breaker remain in the closed position, there would be no relatively rapid dumping of air below the piston 18. It is only if there is a pneumatic force tending to cause a reversal of contact motion that there only then occurs rapid dumping of air on the non-working side of the piston 18; hence, we have functional dumping.

On a straight opening operation, as mentioned previously, opening air is admitted below the piston 18, as well as on top of the piston 18. This occurs since the selector piston 34 will be in its lowered position, and there is hence communication from the opening end of the valve device 26 through conduit 32, conduit 60 and passage 62 to the region below the piston 18. The pressure below the piston 18 on a straight opening operation assumes the form of the curve 90 of Fig. 9. It will be noted that the pressure gradually rises, as indicated by the curve 90, until in the deceleration period indicated by the reference numeral A the pressure below the piston 18 is substantially the same on a straight opening as on an opening immediately following a closing. Thus, the pressure below the piston 18 to provide the desired cushioning effect in deceleration during these two types of opening operations is substantially the same.

It will be observed that the interrupter described in the foregoing discussion only used a single selector mechanism 33 to effect the pressure only below the piston 18 and that during each closing operation air was immediately exhausted above the piston 18 through the exhaust port 28. Thus, the selector 33 described above causes the dumping action to operate differently depending on how soon the opening operation was preceded by a closing operation. This is necessary in that opening is frequently desirable immediately after closure. Also, the initial speed of opening must be high which necessitates large accelerating forces. Also, the final speed does not have to be high.

In closing, conditions are considerably different. For ultra high speed reclosure, immediate reversal is necessary. However, the initial closing speed does not have to be as large, and the contacts must approach under all conditions with sufficient energy to overcome magnetic forces. Also, during such a closing operation, the contacts themselves absorb most of the closing shock. Therefore, there is not the necessity for predeceleration near the end of the stroke on a straight closing operation. If, however, in extreme cases selective dumping on the closing stroke is necessary, the arrangement set forth in Fig. 4 may be employed. It will be noticed that two selector mechanisms are employed, the second selector mechanism 91 being the same as the first selector mechanism 33 but being inverted. The second selector mechanism 91 may be used independently or with the first selective mechanism 33.

The first selector mechanism 33 operates in an identical manner to the selector mechanism 33 illustrated in Fig. 3; consequently, a minute description of its operation is not deemed necessary. The second selector mechanism 91 operates in an identical manner to the first selector mechanism but controls the pressure on the upper side of the piston 18.

In other words during a straight closing operation, closing air is admitted to the closing end of the valve device 26 and not only passes through the pipe 62 to the closing end of the piston 18 but also passes through a conduit 92 and through the second selector mechanism 91, through conduit 93, pipe 57 to the region above the piston 18 on such a straight closing operation. Thus, instead of having a free dumping of air above the piston 18 as took place in Fig. 3 through the exhaust port 28 of valve device 26, there is admission of closing air above the piston 18 as brought about by the mechanism of Fig. 4. The dumping of the closing air on top of the piston 18 in the mechanism of Fig. 4 takes place back through the conduit 93, second selector mechanism 91, conduit 92, branch conduit 38, closing conduit 36, through the bleeder opening 75 of the closing valve 37 and also through the conduit 40 to the blast tube 24.

If an opening operation immediately preceded the closing operation, it will be observed that the selector piston 34 associated with the second selector mechanism 91 will be in its lower position (not shown in Fig. 4) to close off communication between the conduits 92, 93. In this event during such a closing operation immediately following an opening operation, opening air is still above the piston 18, and closing air is not permitted to be forced above the piston 18 inasmuch as the selector valve 34 of selector mechanism 91 is in its lowered position cutting off communication between the conduits 92, 93. Thus, during a closing operation immediately following an opening operation, closing air is not permitted to pass above the piston 18, and dumping of the opening air which is above the piston 18 takes place through the pipe 57, conduit 93, and exhaust port 65 of the second selector mechanism 91, (valve 34 being in its lower position).

From the foregoing description of the mechanism set forth in Fig. 4, it will be observed that again on the opening side of the piston 18 we have provided closing air to be forced on a straight closing operation which is commensurable with the amount of opening air which is above the piston 18 during a closing operation immediately following an opening operation. Thus, the cushioning effect on a straight closing is the same as the cushioning effect on a closing immediately following an opening operation.

In the interrupter of Fig. 10, the mechanism of which is more clearly set forth in Figs. 11, 12 and 13 through 16, it will be observed that we have position dumping, that is, dumping of the driving air during the closing operation is obtained at a time dependent on contact position, or in other words on piston position. This position dumping is to be contrasted with the functional dumping, as was previously described in connection with the interrupters set forth in Figs. 1 through 6. Thus, in position dumping, the driving force is diminished by the opening of the position dumping valve, and the inertia of the moving piston member and contact is depended upon to carry the contacts through to the fully closed position. This is to be contrasted with the arrangement of the interrupter of Fig. 1 in which the driving air was not exhausted unless there was a pneumatic force tending to cause a reversal of contact motion at the complete end of the stroke. If a pneumatic force tending to cause a contact reversal did not occur in the interrupter of Fig. 1, exhausting of the driving air did not rapidly take place.

The position dumping arrangement of Fig. 11, as modified by the incorporation of the selector mechanism 97 will now be described. A piston 98 operable reciprocally within an operating cylinder 99 has a piston rod 100 connected thereto. The piston rod 100 is connected by links 101 (Fig. 10) to an arm 102 which is pivotally connected at its upper end at 103 to a crank plate 104 rigidly affixed, as by welding, to a drive shaft 105. The upper end of the crank plate 104 is pivotally connected at 106 to an insulating operating rod 107, the upper end of which is pivotally connected at 108 to a hook-shaped movable contact member 109 which makes engagement with a stationary contact structure 110.

The lower end of the movable contact 109 is pivotally supported at 111 to a conducting bracket 112, the right-hand end of which is electrically connected to a line terminal 113. The stationary contact structure 110 is electrically connected to a second line terminal 114. Consequently, in the closed circuit position of the interrupter, as shown in Fig. 10, the electrical circuit therethrough includes the line terminal 114, stationary contact structure 110, movable contact 109, conducting bracket 112 to the line terminal 113.

To effect the opening operation of the interrupter, the piston 98 is moved downwardly by the admission of compressed gas upon its top surface as controlled by an opening valve mechanism 115. This causes downward movement of the piston rod 100 and hence counterclockwise rotation of the crank plate 104 about the center of the shaft 105 to thereby cause through the connection of the insulating rod 107 counterclockwise rotation of the movable contact 109 about its center of pivotal mounting 111. This effects separation of the movable contact 109 from the stationary contact 110 to draw an arc (not shown) across the upper end of an insulating blast tube 116.

Arc extinguishing gas is caused to pass upwardly through the blast tube 116 to effect extinction of the arc which is preferably forced into an interrupting structure generally designated by the reference numeral 117. Preferably, the interrupting structure 117 is of a type set forth in U. S. Patent No. 2,272,380 which issued February 10, 1942, to Leon R. Ludwig, Herbert L. Rawlins, and Benjamin P. Baker and which is assigned to the assignee of the instant application.

Control of the upwardly flowing blast of air through the blast tube 116 is brought about by a blast valve 118 having a stem 119 and operated by a rocker arm 120 pivotally mounted at 121 to a side wall of the valve casing 122. Integrally formed with the rocker arm 120 are a pair of externally extending actuating arms 123 biased downwardly by a compression spring 124 to thereby effect closure of the blast valve 118. A roller mechanism is supported between the two actuating arms 123 and is preferably of the type set forth in U. S. Patent No. 2,310,779 which issued February 9, 1943, to Erik H. Hall and Raymond H. Leitzel and which is assigned to the assignee of the instant application.

Briefly, the operation of such a blast valve mechanism 125 is such that a cam portion 126 formed integrally with the crank plate 104 engages the roller assembly supported by the arms 123 during an opening operation to effect clockwise rotation of the actuating arms 123 and rocker arm 120 about the pivot 121 to effect opening of the blast valve 118. Thus, during the opening operation upon separation of the movable contact 109 from the stationary contact 110, there simultaneously occurs opening of the blast valve 118 to permit a blast of compressed gas, such as air, to pass upwardly from the tank 127 through the valve casing 122, upwardly through the blast tube 116 to effect arc extinction within the interrupting structure 117, previously mentioned.

The continued counterclockwise rotation of crank plate 104 and movable contact 109 as effected by continued downward movement of the piston 98 within the operating cylinder 99 effects the placing of an isolating gap in the circuit.

Figure 13:
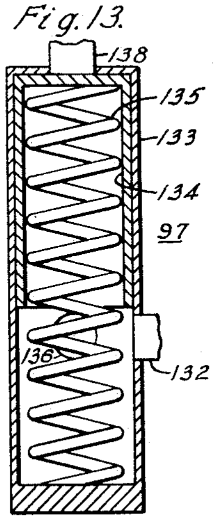
Fig. 13 is an enlarged view in section of the pneumatic selector mechanism employed in the operating mechanism of Fig. 11.

Referring to Fig. 11 which shows more clearly the opening valve mechanism 115 and the closing valve mechanism 128, it will be observed that a conduit 129 interconnects a passage 130 of the opening valve mechanism 115 through a check valve 131 to a conduit 132, the latter leading into the selector mechanism 97, as more clearly shown in Fig. 13.

The selector mechanism comprises a hollow cylinder 133 having a cup-shaped sleeve valve 134 disposed therein and biased to its upper position, as viewed in Fig. 13, by a compression spring 135. A conduit 136 leads from the selector mechanism 97 upwardly through the end plate 137 of the operating cylinder 99.

A conduit 138 communicating at one end with one end of the selector mechanism 97 has its other end 139 communicating with a region 140 above the valve piston 141 of the closing valve mechanism 128.

Figure 12:
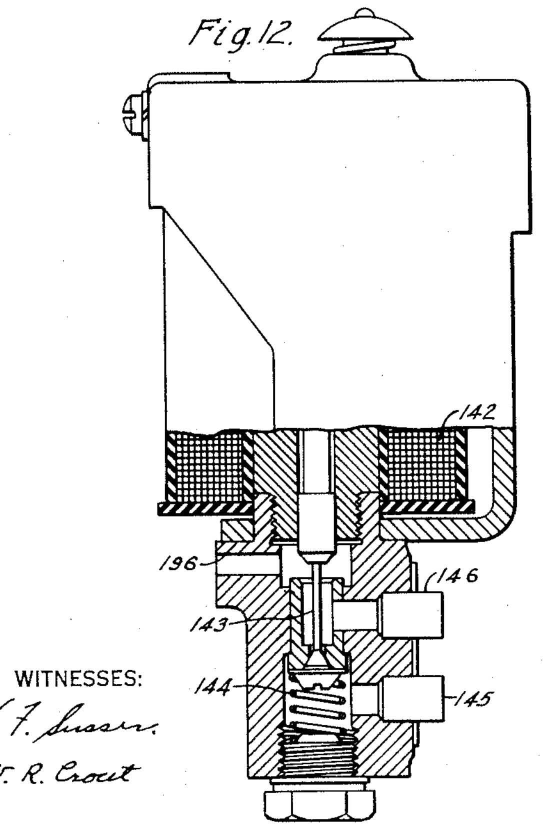
Fig. 12 is an enlarged side elevational view, partially in section, of the pilot valve for the closing valve of the mechanism shown in Fig. 11.

The closing valve mechanism 128 comprises a solenoid 142 more clearly shown in Fig. 12, which upon energization thereof effects downward movement of a pilot valve 143 against the upward biasing action of a compression spring 144 to permit the passage of compressed gas through a passage 145 past the pilot valve 143 and through a passage 146. The passage of gas through the passage 146 on top of the valve piston 141 effects downward movement of the same against the biasing action exerted by a compression spring 147. As in the valve arrangement set forth in Fig. 11, the valve piston 141 has a depending skirt 148 preferably slotted, as shown at 149, to control one or more bleeder openings 150 extending through the valve casing 151 and shown more clearly by the fragmentary elevational view of the opening valve mechanism 115 in Fig. 11. The downward movement of the valve piston 141 causes the lower portion 152 thereof to strike the upper end of the stem 154*a* of the closing valve 154.

Opening of the closing valve 154 permits high pressure gas to pass from the reservoir 155 upwardly past the closing valve 154 and through a passage 156 to the lower end or closing end of the operating cylinder 99 below the operating piston 98. The construction of the opening valve mechanism 115 is identical to the construction of the closing valve mechanism 128, and the reservoir 155 of the opening valve mechanism 115 is connected by a conduit 157 to the reservoir or tank 127 in a manner as more clearly shown in Fig. 10.

The position dump valve of the interrupter of Fig. 10 will now be described. A plurality of ports 158 are provided in the wall 159 of the operating cylinder 99. These ports 158 permit the exhausting of driving closing air through a rotary valve 160 having a configuration more clearly shown in Figs. 15 and 16. The rotary dump valve 160 has a cut-out portion 161 more clearly shown in Fig. 14 which permits the dumping of air through the ports 158 and out one or more exhaust ports 162. The rotary dump valve 160 has a crank portion 163 integrally formed therewith which is pivotally connected to an operating arm 164, the upper end of which is connected through an adjustable connection 165 to the drive shaft 105.

Thus, rotation of the drive shaft 105 determines the position of the rotary dump valve 160. The arrangement is such that the rotary dump valve 160 permits exhausting of the driving closing air from the operating cylinder 99 only near the end of the closing stroke, as shown in Fig. 14. Fig. 14 also shows the relative position of the operating arm 164 when the dump valve 160 is rotated to its open position.

Certain features of the dump valve arrangement are disclosed and claimed in U. S. patent application filed April 21, 1945, Serial No. 589,582, by Leon R. Ludwig, Howard M. Wilcox, and Raymond H. Leitzel, and now Patent No. 2,479,380, granted August 16, 1949, and assigned to the assignee of the instant application.

The operation of the interrupter will now be explained. To effect a straight opening operation from the fully closed circuit position of the interrupter, as shown in Figs. 10 and 11, the solenoid 166 associated with the opening valve mechanism 115 is energized. This causes downward motion of a pilot valve 143 (Fig. 12) to permit communication between the passage 153 and the space above the valve piston, not shown, (refer to Figs. 11 and 12). This causes downward movement of the opening valve 168 to permit compressed gas to flow from the tank 127 (Fig. 10) through conduit 157, reservoir 155, upwardly past opening valve 168 through passage 130 to the top opening side of the piston 98 and also downwardly through the conduit 129, check valve 131, conduit 132, through the selector mechanism 97 (valve 134 being its upper position) and upwardly through the conduit 136 to the lower end of the operating cylinder 99.

Thus, in other words during a straight opening operation, opening air is admitted on both the top and bottom sides of the operating piston 98. Downward movement of the piston 98 and opening of the contact structure take place in the manner previously described. The rotary dump valve 160 is open during the initial portion of the opening operation and closes before the piston 98 passes ports 158. For the remainder of the opening operation the dump valve 160 remains closed. Thus no dumping occurs on the opening stroke. On the closing operation the dump valve 160 opens when piston 98 is near the end of the closing stroke thus dumping the driving air through ports 158 and out 162.

The opening air which is admitted below the piston 98 during the opening operation is compressed near the end of the opening stroke and is forced out through the bleeder openings 150 associated with the closing valve mechanism 128. Thus, there is provided a cushioning effect during a straight opening operation.

To effect a straight closing operation of the interrupter, the closing valve mechanism 128 is energized to permit closing air to pass upwardly past the closing valve 154 through passage 156 to the lower end of the operating cylinder 99 where it forces the piston 98 upwardly. Also, compressed gas passing by the pilot valve 143 (Fig. 12) passes through the passage 146, conduits 139, 138 to the selector mechanism 97 where it forces the valve 134 downwardly as viewed in Fig. 13, against the spring pressure 135 to close off communication between the conduits 132, 136.

Thus, during a straight closing operation, compressed gas is admitted below the piston 98 and also effects closing of the valve 134 associated with the selector mechanism 97.

The check valve 131 prevents air compressed underneath the piston 98 on an opening operation from passing back through the conduit 129 thus forcing this air compressed beneath the piston 98 to escape through the passage 156 and out through the ports 150. For a closing operation the selector piston 134 accomplishes the same function.

The admission of closing air below the piston 98 forces the piston 98 upwardly to effect closure of the contact structure, and near the end of the closing stroke, the rotary dump valve 160 opens to permit exhausting of the driving closing air through the ports 158, past the rotary dump valve 160 and out the exhaust ports 162 provided in the wall 159 of the operating cylinder 99.

If the interrupter is closed during the existence of overload conditions in the circuit controlled by the interrupter, the protective relay, not shown, will be energized by the passage of an overload current through the interrupter and will cause an opening operation to take place immediately after such a closing operation. In this event, that is, during an opening immediately following a closing operation, there still remains considerable closing air below the piston 98, and the valve 134 associated with the selector mechanism 97 is still in its lowered position, as viewed in Fig. 13, preventing communication between the conduits 132, 136. Thus, opening air is not permitted to pass through the selector mechanism 97 and upwardly into the lower end of the operating cylinder 99, as was the case during a straight opening operation. This is desirable inasmuch as closing air still remains below the piston 98, and hence there is no necessity for sending additional opening air through the selector mechanism 97 and upwardly through the conduit 136 to the lower end of the operating cylinder 99. Consequently, during an opening immediately following a closing operation, the piston 98 compresses closing air below the piston and forces such closing air out the ports 150 associated with the closing valve mechanism 128.

From the foregoing description of a straight opening operation, as contrasted with an opening operation immediately following a closing operation, it will be apparent that in either event there is provided substantially the same amount of gas below the piston 98 to be compressed and exhausted through the ports 150 of the closing valve mechanism 128. Thus, the size of the ports 150 and the number thereof can be regulated for both a straight opening operation and for an opening immediately following a closing operation since the quantity of air below the piston 98 is substantially the same for both types of operation. The net result is a desirable cushioning effect near the end of the opening operation to minimize shock and stress on the operating mechanism.

As was the case in Fig. 4, it may be desirable to associate a second selector mechanism 169 with the interrupter of Fig. 10 to have the air on top of the piston 98 regulated during a straight closing operation, as compared with a closing operation immediately following an opening operation. Fig. 17 shows a modified type of operating mechanism for the interrupter of Fig. 10 which incorporates a second selector mechanism 169, as well as a first selector mechanism 97. The first selector mechanism 97 operates identically in the manner as previously described in connection with Fig. 11. The second selector mechanism 169 could be used alone or with the first selector mechanism 97. Its action is entirely independent of the first selector mechanism 97.

In the mechanism of Fig. 17 it is necessary for rapid reclosing operations to rapidly dump opening air and because of this a two positional dump valve 170 as shown more fully in Fig. 18 is employed.

Referring to Fig. 18, it will be observed that the rotary dump valve 160 permits exhausting of gas out of the operating cylinder 99 near the end of both the opening and closing strokes of the interrupter, as provided by the two sets of exhaust openings 162, as shown in Fig. 18. If the two positional dump valve 170 were not employed, that is, if only a single position dump valve, as shown in Fig. 14, were employed, there would not result a sufficient rapid dumping of opening air out of the operating cylinder 99 to permit rapid reclosing operations which are necessary in the mechanism, as shown in Fig. 17.

The operation of the mechanism, shown in Fig. 17, will now be described. The opening operation and the opening operation immediately following a closing operation of the mechanism of Fig. 17 is exactly the same as in the mechanism of Fig. 11 previously described; consequently, a further description thereof appears unnecessary. However, during a straight closing operation, closing air is not only admitted below the piston 98 but is also passed upwardly through the conduit 171, check valve 172 through the second selector mechanism 169 and downwardly through the conduit 173 to the top side of the piston 98. Thus, during a straight closing operation, closing air is admitted on both the top and bottom sides of the piston 98. The closing air which is admitted on the top side of the piston 98 is exhausted near the end of the closing stroke through the ports 150 associated with the opening valve mechanism 115. The provision of closing air on top of the piston 98 which air is compressed provides the desired cushioning action during the closing operation to minimize stress upon the interrupter mechanism.

During an opening operation, the opening of the opening valve 168 not only permits opening air to pass above the piston 98 and below the piston 98 through the conduit 129 (as described previously in connection with Fig. 11) but also the opening pilot valve 143, not shown, permits opening air to pass through the conduit 174 to effect closing of the valve 134 of the second selector mechanism 169. The second selector mechanism 169 is identical in construction to the first selector mechanism 97, as shown in Fig. 13. Thus, during a straight opening operation, the valve 134 associated with the second selector mechanism 169 is closed by the opening air. If the interrupter is immediately reclosed, when it reaches the end of the opening operation, the closing air during such a subsequent immediate closing operation is not permitted to pass upwardly through the conduit 171 and through the second selector mechanism 169 into the conduit 173 to the upper end of the operating cylinder 99, inasmuch as there already exists previous opening air above the piston 98 and since the valve 134 associated with the second selector mechanism 169 is already closed.

Thus, during a straight closing operation, a portion of the closing air is compressed on the top side of the piston 98. On a closing immediately following an opening operation, previous opening air is compressed on top of the piston 98 during such an immediate reclosing operation, and in both cases the air above the piston 98 is compressed and exhausted out through the ports 150 associated with the opening valve mechanism 115.

The interrupters shown in Figs. 11 and 17 are of the position dumping type. However, the mechanism may be slightly modified to cause it to incorporate functional dumping, that is, rapid dumping of the driving air is only permitted upon the presence of a pneumatic force tending to cause a reversal of contact motion. Unless there is such a pneumatic force tending to cause a reversal of contact motion, the driving air is not dumped but is gradually lowered in pressure through leakage through bleeder openings 158.

Fig. 19 shows in fragmentary fashion a modified type of mechanism similar to that of Fig. 11 except that functional dumping is employed instead of positional dumping. It will be observed that the rotary dump valve 160 is omitted, and a reciprocally operable slide valve 178 is provided which is operated through a rod 179, the upper end of which is secured to a piston 180 operated within a cylinder 181. The upper end of the cylinder 181 is connected by a conduit 182 to the region 140 of the closing valve mechanism 128 (Fig. 11). The lower end of the cylinder 181 is connected by a conduit 183 to a similar region associated with the opening valve mechanism 115.

The slide valve 178 controls the passage of compressed gas through exhaust ports 184, 185 formed in the wall 159 of the operating cylinder 99.

The operation of the modified type of mechanism shown in Fig. 19 will now be described. The operation of the selector mechanism 97 is the same as previously described in Figs. 11 and 17. During the closing operation, compressed gas is admitted from the region 140 within the closing valve mechanism 128 through the conduit 182 to the upper side 187 of the piston 180 the latter being reciprocally operable within the piston cylinder 181.

Thus, during the closing operation, the piston 180 is forced downwardly within the cylinder 181 to force the slide valve 178 downwardly, thereby closing the exhaust port 184 and opening the upper exhaust port 185. Air on the upper side of the piston 98 is hence exhausted through the exhaust port 185 during the closing stroke, the exhaust port 184 remaining closed throughout the entire closing stroke. The exhaust port 184 is not opened unless there is a reversal of contact motion, thereby resulting in downward movement of the piston 98. This would be brought about by energization of the opening valve mechanism 115 which would permit compressed gas to be forced from the region 140 thereof, not shown, through the conduit 183 to the lower side 193 of the piston 180, thereby forcing the piston 180 upwardly within the cylinder 181 to open the exhaust port 184 and close the exhaust port 185. As a result, the previous closing air is dumped out of the exhaust port 184. The piston 180 is permitted to move upwardly rapidly within the cylinder 181 because of the exhaust of air from the upper side 187 of the piston 180 through the conduit 182, through the region 140, passage 146 and out of exhaust port 196 (Fig. 12). Correspondingly, during the closing operation and hence during admission of compressed air to the upper side 187 of the piston 180 within the cylinder 181, the air below the piston 180 is permitted to exhaust out of the conduit 183, through the region 140 associated with the opening valve mechanism 115 and out through the exhaust port 196 associated with the pilot valve 143 of the opening valve mechanism 115, not shown.

Thus, the slide valve arrangement 190 shown in Fig. 19 adapts the operating structure of Fig. 11 associated with the interrupter of Fig. 10 for functional dumping. It will be remembered that the arrangements shown in Figs. 11 and 17 were adapted for positional dumping, that is, dumping of the driving air was determined as a function of contact position and hence of operating piston 98 position.

The selector mechanism 97, associated with Fig. 19, operates identically in the manner as described previously in connection with Fig. 11. Thus, the only difference between Figs. 11 and 19 is that the former is arranged for positional dumping and the latter is arranged for functional dumping.

It is apparent that if desired the slide valve arrangement 190 of Fig. 19 could be employed in the operating arrangement of Fig. 17 so that the latter instead of being arranged for positional dumping could be arranged for functional dumping, as in Fig. 19.

From the foregoing discussion of several embodiments of our invention, it is apparent that we have provided an improved operating arrangement for compressed gas type of circuit interrupters in which by a substantial equalization of pressure during the deceleration portion of the opening stroke in straight opening and in opening immediately following closing we have minimized the stresses imposed upon the mechanism and have also minimized the possibility of breakage of the porcelains associated with the interrupting structure. We have also disclosed how such a substantial equalization of pressure during the deceleration portion of the closing stroke as employed in a straight closing as contrasted with a closing immediately following an opening operation may also be employed.

The mechanisms that we have shown are adapted for use on both a structure employing positional dumping, as well as on a structure employing functional dumping. Furthermore, the first selector mechanism associated with the opening operations may be used independently or with a second selector mechanism, the latter controlling the closing operations of the interrupter.

The result of an application of our invention to a circuit interrupter of the compressed gas type is uniform operation with a desired cushioning effect during the deceleration portion at the end of the stroke. It will also be observed that the mechanism which we employ is relatively inexpensive in cost and is simple in operation. There are few moving parts and breaker operation is greatly improved.

Although we have shown and described specific structures, it is to be clearly understood that the same were merely for the purpose of illustration and that changes and modifications may readily be made therein by those skilled in the art without departing from the spirit and scope of the appended claims.

We claim as our invention:

1. In a circuit interrupter of the gas operated type, a movable contact, movable contact operating means including an operating cylinder and a piston in the cylinder mechanically connected to the movable contact, means for admitting compressed gas to said cylinder to operate said piston and for admitting compressed gas to the non-working side of said piston for retarding movement of said piston, and a selector valve for causing the gas pressure on the non-working side of the piston to be substantially the same on a straight opening operation as on a closing-opening operation.

2. In a circuit interrupter of the gas operated type, a movable contact, movable contact operating means including an operating cylinder and a piston in the cylinder mechanically connected to the movable contact, means for admitting compressed gas to said cylinder to operate said piston and for admitting compressed gas to the non-working side of said piston for retarding movement of said piston, and a selector valve for causing the gas pressure on the non-working side of the piston to be substantially the same on a straight closing operation as on on open-close operation.

3. In a circuit interrupter of the gas operated type, a movable contact, movable contact operating means including an operating cylinder and a piston in the cylinder mechanically connected to the movable contact, means for admitting compressed gas to said cylinder to operate said piston to move said movable contact to open and closed position, means for admitting a charge of compressed gas to the non-working side of said piston to retard movement of said piston, a selector valve for causing the gas pressure on the non-working side of the piston to be substantially the same on a straight opening operation as on a closing-opening operation, and valve means for causing the gas pressure on the non-working side of the piston to be substantially the same on a straight closing operation as on an open-close operation.

4. In a circuit interrupter, an operating cylinder, a piston movable within the cylinder, contact means interconnected with the piston so that when the piston is at one end of the operating cylinder the contact means is in the open position and when the piston is at the other end of the operating cylinder the contact means is in the closed position, means for admitting compressed gas to said cylinder to operate said piston, valve means for admitting compressed gas to the non-working side of said piston for retarding movement of said piston, and a selector valve for causing the gas pressure on the non-working side of the piston to be substantially the same on a straight closing operation as on an open-close operation.

5. In a circuit interrupter of the gas blast type, an operating cylinder having an opening end and a closing end, contact means, a piston connected to the contact means and reciprocally movable within the operating cylinder, a valve device associated with the cylinder having an inlet port and an exhaust port adjacent one end thereof communicating with the opening end of the operating cylinder, a pneumatic selector mechanism including a selector valve, a conduit communicating from said one end of the valve device to the selector mechanism above the selector valve in the open position of said selector valve, the valve device having an inlet port at the other end thereof communicating with the closing end of the operating cylinder, a conduit communicating from said other end of the valve device to the selector mechanism above the selector valve, a conduit for admitting closing air to the valve device and a conduit for simultaneously admitting closing air to the selector mechanism below the selector valve.

6. In a circuit interrupter of the gas blast type, an operating cylinder having an opening end and a closing end, contact means, a piston connected to the contact means and reciprocally movable within the operating cylinder, a valve device associated with the cylinder having an inlet port and an exhaust port adjacent one end thereof communicating with the opening end of the operating cylinder, a pneumatic selector mechanism including a selector valve, a conduit communicating from said one end of the valve device to the selector mechanism above the selector valve when said selector valve is in the open position, the valve device having an inlet port communicating with the closing end of the operating cylinder, a conduit communicatng from the other end of the valve devce to the selector mechanism above the selector valve, a conduit for admitting closing air to the valve device, a conduit for simultaneously admitting closing air to the selector mechanism below the selector valve, and means biasing the selector valve toward the open position.

7. In a circuit interrupter of the gas blast type, an operating cylinder having an opening end and a closing end, contact means, a piston connected to the contact means and reciprocally movable within the operating cylinder, a valve device associated with the cylinder having an inlet port and an exhaust port adjacent one end thereof communicating with the opening end of the operating cylinder, a pneumatic selector mechanism including a selector valve, a conduit communicating from the opening end of the valve device to the selector mechanism above the selector valve, the valve device having an inlet port adjacent the other end thereof communicating with the closing end of the operating cylinder, a conduit communicating from said other end of the valve device to the selector mechanism above the selector valve, a conduit for admitting closing air to the valve device, a conduit for simultaneously admitting closing air to the selector mechanism below the selector valve, and a single movable valve member movable within the valve device for simultaneously controlling by valve action the opening and closing ends of the valve device.

8. In a circuit interrupter of the gas blast type, contact means, an operating cylinder, a piston connected to the contact means and movable within the operating cylinder, valve means for admitting compressed gas to said cylinder to operate said piston and for admitting compressed gas to the non-working side of said piston to retard movement of said piston, a dump valve operable according to the position of said piston for dumping of the driving closing gas during the closing operation, a first selector mechanism for causing the gas pressure on the non-working side of the piston to be substantially the same on a straight opening operation as on a closing-opening operation, and a second selector valve for causing the gas pressure on the non-working side of the piston to be substantially the same on a straight closing operation as on an open-close operation.

9. A circuit interrupter comprising an operating cylinder, a piston movable in said cylinder, contact means connected to said piston to be operated to open and closed positions thereby, means for alternately admitting compressed gas to opposite ends of said cylinder to operate said piston, means for admitting compressed gas to said cylinder on the non-working side of said piston and selector valve means responsive to the condition of the interrupter prior to operation thereof for controlling the admission of compressed gas to said non-working side of said piston.

10. A circuit interrupter comprising an operating cylinder, a piston movable in said cylinder, contact means connected to said piston to be operated to open and closed positions thereby, valve means for alternately admitting compressed gas to opposite ends of said cylinder to operate said piston, selector valve means for admitting compressed gas to the non-working side of said piston for retarding movement of said piston, spring means for positioning said selector valve means to admit retarding gas to the non-working side of said piston when said piston is allowed to stand in operative position before being reversed, and said selector valve means being positioned in response to the condition of said interrupter just prior to a quick reversal of movement of said piston to prevent admission of gas to the non-working side of said piston following the reversal of said piston.

11. A circuit interrupter comprising contact means, an operating cylinder, a piston movable in said cylinder and connected to said contact means, a valve device operable to alternately admit compressed gas to said cylinder on opposite sides of said piston to effect opening and closing of said contact means, a selector valve device comprising a first selector valve responsive to the condition of the interrupter just prior to an opening operation for controlling admission of compressed gas to the non-working side of said piston to retard opening movement of said contact means, and a second selector valve responsive to the condition of the interrupter just prior to a closing operation for controlling admission of compressed gas to the non-working side of the piston to retard closing movement of said contact means.

12. A circuit interrupter comprising contact means, an operating cylinder, a piston movable in said cylinder and connected to said contact means, inlet valve means for alternately admitting compressed gas to opposite ends of said cylinder to cause said piston to open and close said contact means, an exhaust valve operable in accordance with the position of said piston for quickly exhausting the closing gas during a closing operation, and selector valve means responsive to the condition of said interrupter prior to an operation for controlling admission of compressed gas to the cylinder on the non-working side of the piston.

13. A circuit interrupter comprising contact means, an operating cylinder, a piston movable in said cylinder to open and close said contact means, a compressed gas supply system for supplying compressed gas to said cylinder, valve means for admitting compressed gas to said cylinder to operate said piston and for admitting compressed gas to said cylinder on the non-working side of said piston to retard operation of said piston, a selector valve responsive to pressure remaining in said supply system for controlling the admission of compressed gas to the non-working side of said piston, and a dump valve for quickly exhausting the gas on the non-working side of said piston during opening operations.

14. A circuit interrupter including contact means, operating mechanism comprising a cylinder, a piston connected to said contact means and arranged for intermittent reciprocating movement in said cylinder to open and close said contact means, valve means for admitting compressed gas to said cylinder to operate said piston and for admitting compressed gas to the non-working side of said piston to retard movement of said piston, and time delay means associated with said mechanism for controlling said valve means to admit compressed gas to the non-working side of said piston only if the contacts have remained in one position for a predetermined length of time.

15. A circuit interrupter comprising contact means, an operating cylinder, a piston connected to said contact means and arranged for intermittent reciprocating movement in said cylinder to open and close said contact means, valve means for admitting compressed gas to said cylinder to operate said piston and for admitting compressed gas to said cylinder on the non-working side of said piston to retard movement of said piston, a first selector valve responsive to the condition of the interrupter just prior to an opening operation for controlling admission of compressed gas to the non-working side of said piston, and a second selector valve responsive to the condition of the interrupter just prior to a closing operation for controlling the admission of compressed gas to the non-working side of said piston.

16. A circuit interrupter comprising contact means, an operating cylinder, a piston connected to said contact means and arranged for intermittent reciprocating movement in said cylinder to open and close said contacts, a supply system for supplying compressed gas to said cylinder, valve inlet means for admitting compressed gas to said cylinder to operate said piston and for admitting compressed gas to said cylinder on the non-working side of said piston to retard movement of said piston, and selector valve means in said supply system between said inlet valve means and said cylinder responsive to pressure remaining in said system just prior to an operation for controlling the admission of compressed gas to the non-working side of said piston.

17. A circuit interrupter having a movable contact, compressed gas operating means for moving said contact member to open and to closed positions comprising a cylinder and a piston reciprocally movable in said cylinder connected to said contact member, means for supplying compressed gas to opposite ends of said cylinder to open and close the interrupter, a separate inlet port for each end of the cylinder and a separate exhaust port for each end of said cylinder, a single valve member operated by compressed gas admitted to either end of said cylinder to close the corresponding exhaust port and open the exhaust port at the other end of said cylinder, and a selector valve controlling the exhaust port at the closing end of said cylinder on straight opening operations to admit compressed gas to said cylinder on the non-working side of said piston to retard movement of said piston, and said selector valve being operable to open the exhaust port at the closing end of said cylinder to exhaust the gas pressure on the non-working side of said piston at the beginning of the opening stroke of a closing-opening operation of said interrupter.

BENJAMIN P. BAKER.
JACK E. SCHRAMECK.

REFERENCES CITED

The following references are of record in the file of this patent:

UNITED STATES PATENTS

| Number | Name | Date |
|---|---|---|
| 928,100 | Berry | July 13, 1909 |
| 1,679,212 | Forman | July 31, 1929 |
| 1,772,773 | Forman | Aug. 12, 1930 |
| 1,897,350 | Wiegner | Feb. 13, 1933 |